(12) United States Patent
Chung et al.

(10) Patent No.: US 7,327,346 B2
(45) Date of Patent: Feb. 5, 2008

(54) ELECTRODE AND CONNECTING DESIGNS FOR ROLL-TO-ROLL FORMAT FLEXIBLE DISPLAY MANUFACTURING

(75) Inventors: Jerry Chung, Mountain View, CA (US); Jack Hou, Fremont, CA (US); Rong-Chang Liang, Cupertino, CA (US)

(73) Assignee: SiPix Imaging, Inc., Fremont, CA (US)

( * ) Notice: Subject to any disclaimer, the term of this patent is extended or adjusted under 35 U.S.C. 154(b) by 681 days.

(21) Appl. No.: 10/447,719

(22) Filed: May 28, 2003

(65) Prior Publication Data

US 2004/0008179 A1    Jan. 15, 2004

Related U.S. Application Data

(60) Provisional application No. 60/385,053, filed on May 29, 2002.

(51) Int. Cl.
G09G 3/34    (2006.01)
(52) U.S. Cl. .......................... 345/107; 345/33
(58) Field of Classification Search ............ 345/33–34, 345/107; 340/815.44
See application file for complete search history.

(56) References Cited

U.S. PATENT DOCUMENTS

| | | | |
|---|---|---|---|
| 3,668,106 A | | 6/1972 | Ota |
| 4,026,103 A | * | 5/1977 | Ichikawa et al. ............. 368/67 |
| 4,093,534 A | | 6/1978 | Carter et al. |
| 4,268,913 A | * | 5/1981 | Nakagiri et al. ............. 368/10 |
| 4,380,371 A | | 4/1983 | Frantz |
| 4,423,929 A | * | 1/1984 | Gomi ........................ 349/83 |
| 4,455,185 A | | 6/1984 | Sasaki et al. |
| 5,057,768 A | * | 10/1991 | Havel ........................ 324/115 |
| 5,058,996 A | * | 10/1991 | Washizuka et al. ......... 349/142 |
| 5,751,257 A | | 5/1998 | Sutherland |
| 5,930,026 A | | 7/1999 | Jacobson et al. ........... 359/296 |
| 5,952,985 A | * | 9/1999 | McKinney et al. ........... 345/42 |
| 5,961,804 A | | 10/1999 | Jacobson et al. ........... 204/606 |
| 6,219,014 B1 | * | 4/2001 | Havel ........................ 345/83 |

(Continued)

FOREIGN PATENT DOCUMENTS

EP    1 195 603    4/2002

(Continued)

OTHER PUBLICATIONS

Liang, R.C et al., "Microcup Electrophoretic Displays by Roll-to-Roll Manufacturing Processes" *Proc. of the IDW'02*, International Conference Center Hiroshima (2002).

(Continued)

*Primary Examiner*—Ricardo Osorio
(74) *Attorney, Agent, or Firm*—Howrey LLP

(57) ABSTRACT

The present invention generally is directed to electrode designs suitable for roll-to-roll format flexible manufacturing of an EPD. It is also directed to an EPD having a segment design in a repeated pattern across an entire roll of the display. The EPD preferably is microcup-based. The EPD manufactured according to the present invention has the appearance of a roll of wall paper and it can be cut into any desired sizes or formats. The EPD has electrode or trace lines which may be exposed by asymmetrical cutting and stripping without the need of precision registration.

9 Claims, 19 Drawing Sheets

STITCH OF 7-SEGMENT AND 14-SEGMENT PANEL

U.S. PATENT DOCUMENTS 6,229,590 B1 * 5/2001 Bannai et al. .............. 349/142
2003/0197915 A1 * 10/2003 Hou et al. ................. 359/296

FOREIGN PATENT DOCUMENTS

| GB | 2 067 814 | 7/1981 |
|----|-----------|--------|
| JP | 02-101429 | 4/1990 |
| JP | 02-254420 | 10/1990 |
| JP | 04-198914 | 7/1992 |
| JP | 07-064037 | 7/1995 |
| JP | 09-325328 | 12/1997 |
| JP | 11-015007 | 1/1999 |
| JP | 2001-109407 | 4/2001 |
| WO | WO 00/67110 | 11/2000 |
| WO | WO 01/67170 | 9/2001 |
| WO | WO 02/01281 | 1/2002 |
| WO | WO 02/065215 | 8/2002 |

OTHER PUBLICATIONS

Liang, R.C., "Microcup® Electrophoretic and Liquid Crystal Displays by Roll-to-Roll Manufacturing Process" *USDC Flexible Microelectronics & Displays Conference* Phoenix, AZ (2003).

Liang, R.C. et al., "Passive Matrix Microcup® Electrophoretic Displays" *Proc. of the IDMC'03*, Taipei International Convention Center Taiwan (2003).

Liang, R.C. et al., "Microcup® LCD ANew Type of Dispersed LCD by A Roll-to-Roll Manufacturing Process" *Proc. of the IDCM'03*, Taipei International Convention Center Taiwan (2003).

Liang, R.C. et al., "Microcup® Active and Passive Matrix Electrophoretic Displays by a Roll-to-Roll Manufacturing Process" *Society for Information Display* 2003 International Symposium Digest of Technical Papers, XXXIV Book II Baltimore Maryland USA.

Hopper, M., et al. "An Electrophoretic Display, Its Properties, Model and Addressing" *IEEE Trans. Electr. Dev.* 26(8):1148-1152 (1979).

U.S. Appl. No. 09/518,488, filed Mar. 3, 2000 (reference available on request).

U.S. Appl. No. 09/606,654, filed Jun. 28, 2000 (reference available on request).

U.S. Appl. No. 09/784,972, filed Feb. 15, 2001 (reference available on request).

U.S. Appl. No. 10/422,608, filed Apr. 23, 2003 (reference available on request).

Chen, S.M., <<The New Applications and the Dynamics of Companies >>, TRI, May 2003 (in Chinese, English abstract attached, full translation available upon request).

Liang, R.C. et al., <<Microcup(R) displays : Electronic Paper by Roll-to-Roll Manufacturing Processes >>, Journal of the SID, vol. 11/4, Feb. 18-23, 2003, pp. 621-628.

Liang, R. C., <<Newly-Develooped Color Electronic Paper Promises—Unbeatable Production Efficiency >> Nikkei Microdevices, Dec. 2002 (in Japanese, with English translation).

* cited by examiner

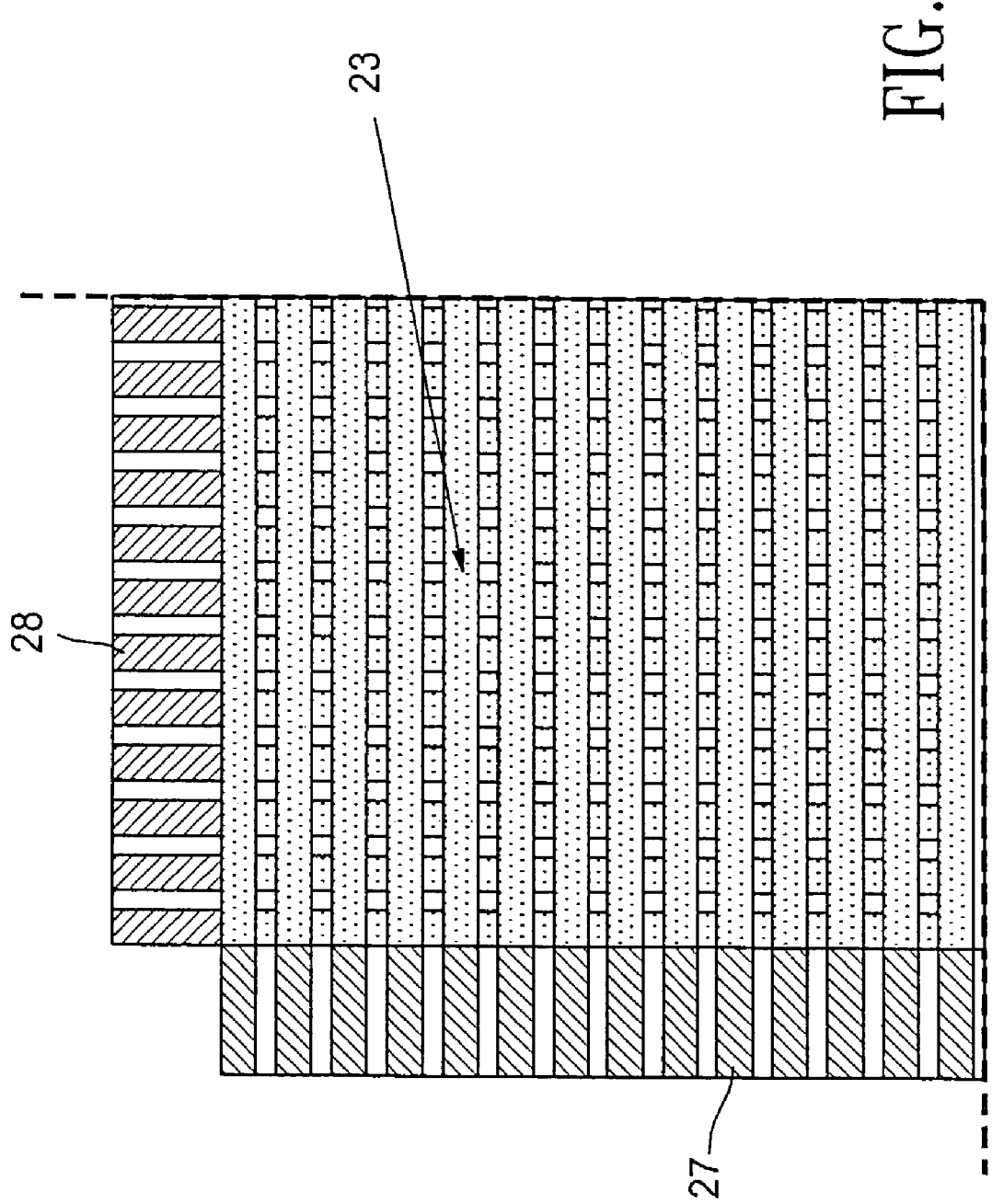

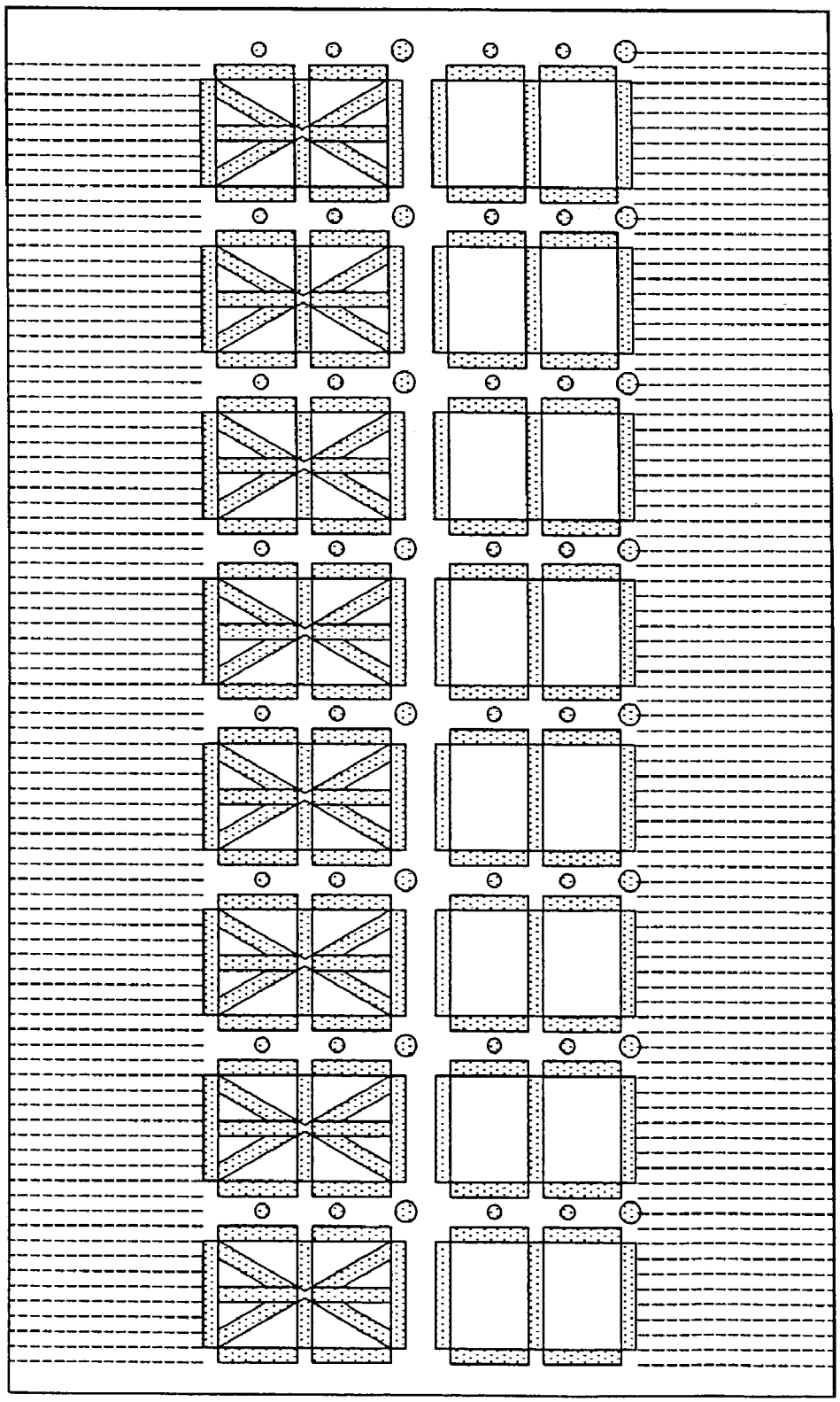
FIG. 4B SYMMETRICAL ELECTRODE PATTERN

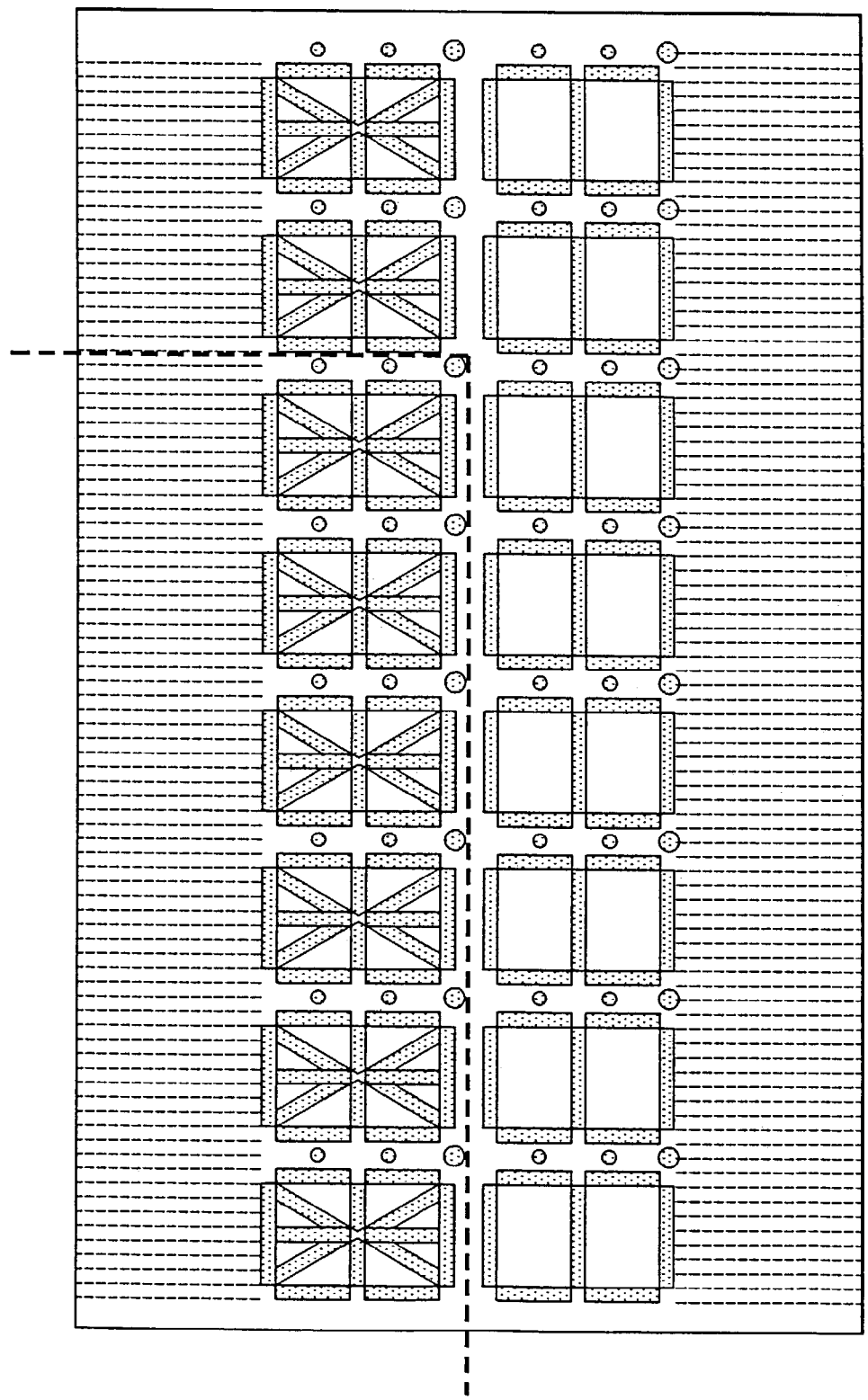
FIG. 4D  CUT FOR 14-SEGMENT ALPHANUMERICAL DISPLAY

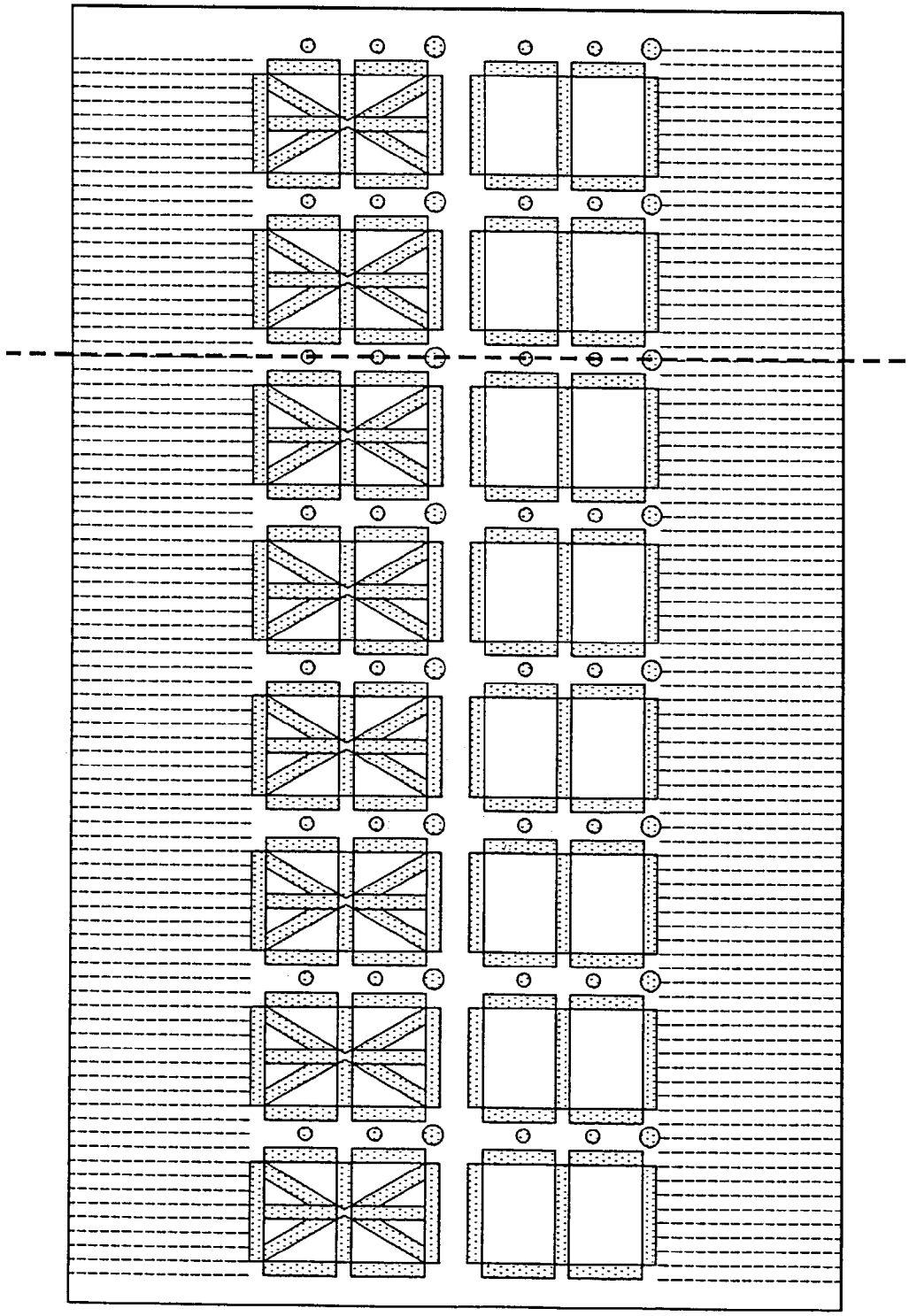
FIG. 4E CUT FOR COMBINATION OF 7-SEGMENT AND 14-SEGMENT

STITCH OF 7-SEGMENT AND 14-SEGMENT PANEL

ELECTRODE AND CONNECTING DESIGNS FOR ROLL-TO-ROLL FORMAT FLEXIBLE DISPLAY MANUFACTURING

RELATED APPLICATIONS

This application claims the benefit of U.S. Provisional Application No. 60/385,053 filed May 29, 2002, which is incorporated herein by reference in its entirety.

BACKGROUND OF THE INVENTION

An electrophoretic display (EPD) is a non-emissive device based on the electrophoresis phenomenon influencing charged pigment particles suspended in a colored dielectric solvent. This type of display was first proposed in 1969. An EPD typically comprises a pair of opposed, spaced-apart plate-like electrodes, with spacers predetermining a certain distance between the electrodes. At least one of the electrodes, typically on the viewing side, is transparent.

When a voltage difference is imposed between the two electrodes, the pigment particles migrate by attraction to the plate of polarity opposite that of the pigment particles. Thus, the color showing at the transparent plate, determined by selectively charging the plates, can be either the color of the solvent or the color of the pigment particles. Reversal of plate polarity will cause the particles to migrate back to the opposite plate, thereby reversing the color. Intermediate color density (or shades of gray) due to intermediate pigment density at the transparent plate may be obtained by controlling the plate charge through a range of voltages or pulsing time.

EPDs of different pixel or cell structures have been reported previously, for example, the partition-type EPD (M. A. Hopper and V. Novotny, IEEE Trans. Electr. Dev., Vol. ED 26, No. 8, pp. 1148-1152 (1979)) and the microencapsulated EPD (U.S. Pat. Nos. 5,961,804 and 5,930,026).

An improved EPD technology was recently disclosed in co-pending applications, U.S. Ser. No. 09/518,488, filed on Mar. 3, 2000 (corresponding to WO 01/67170 published on Sep. 13, 2001), U.S. Ser. No. 09/606,654, filed on Jun. 28, 2000 (corresponding to WO 02/01281 published on Jan. 3, 2002) and U.S. Ser. No. 09/784,972, filed on Feb. 15, 2001 (corresponding to WO02/65215 published on Aug. 22, 2002), all of which are incorporated herein by reference. The improved EPD comprises isolated cells formed from microcups of well-defined shape, size and aspect ratio and filled with an electrophoretic fluid comprising charged particles dispersed in a dielectric solvent. The filled cells are individually sealed with a polymeric sealing layer, preferably formed from a composition comprising a material selected from a group consisting of thermoplastics, thermosets and precursors thereof.

The microcup wall in fact is a built-in spacer or support to keep the top and bottom substrates apart at a fixed distance and provides superior mechanical properties and structural integrity. Since the display fluid within the display prepared by the microcup technology is enclosed and isolated in each cell, the microcup-based display may be cut into almost any dimensions without the risk of damaging the display performance due to the loss of display fluid in the active areas.

The microcup structure also enables a format flexible and efficient roll-to-roll continuous manufacturing process for EPDs, particularly for thin, flexible and durable EPDs. The displays can be prepared on a continuous web of a conductor film such as ITO/PET by, for example, (1) coating a radiation curable composition onto a conductor film (i.e., ITO/PET film), (2) forming the microcup structure by a microembossing or photolithographic method, (3) filling the microcups with an electrophoretic fluid and sealing the filled microcups, (4) laminating the sealed microcups with a second conductor film and (5) slicing and cutting the display into a desirable size or format for assembling. To complete the construction of a display device, the electrode lines of the display must be exposed and connected to a driver circuitry.

However, not all electrode designs are suitable for use in a roll-to-roll format flexible manufacturing process. In fact, implementation of the roll-to-roll process is severely limited by the design of the electrodes (and, if present, also the via holes and trace lines) connecting to a driver circuitry. To enable a roll-to-roll format flexible process, the electrodes and connecting traces require special designs. However, the pitch sizes of the electrode lines of the specially designed electrodes very often are not compatible with those of the commonly used drivers. Consequently, an expensive fan-in/fan-out flexible circuitry is typically needed as an adapter to bridge the electrode lines and the driver circuit. Bonding the fan-in/fan-out flexible circuitry to both the display panel and the driver is an expensive and time-consuming process.

Accordingly, in order to reduce the cost of manufacturing and maintaining display modules which typically comprise a display panel, driver and necessary circuitries, there is a strong need for a system which is more reliable, easier to install and maintain and suitable for roll-to-roll format flexible manufacturing.

SUMMARY OF THE INVENTION

The present invention is directed to electrode designs suitable for roll-to-roll format flexible manufacturing of an EPD.

The invention is also directed to an EPD having a segment design in a repeated pattern across an entire roll of the display. The EPD preferably is microcup-based. The EPD manufactured according to the present invention has the appearance of a roll of wall paper and it can be cut into any desired sizes or formats. The EPD has electrodes or trace lines which may be exposed by asymmetrical cutting and stripping without the need of precision registration.

More specifically, the first aspect of the invention is directed to an electrode design suitable for roll-to-roll format flexible manufacturing of passive matrix EPDs. The electrode design comprises continuous row electrodes having substantially the same width (W-1) and substantially the same line gap (G-1) across the entire roll and continuous column electrode lines having substantially the same width (W-2) and substantially the same line gap (G-2) across the entire roll. The width W-1 may be the same as or different from the width W-2. Similarly the line gap G-1 may be the same as or different from the line gap G-2.

The second aspect of the present invention is directed to an electrode design wherein the row and column electrodes form an oblique angle from the direction of a support web. More specifically, the row electrodes may have an angle of from about 35° to about 55°, preferably 45°, from the direction of the web and the column electrodes form an angle of about 90° from the row electrodes.

The third aspect of the present invention is directed to an electrode design including, if present, the via holes and connecting traces, for a segment EPD having a segment design in a repeated pattern of the same size, shape, orientation and spacing between adjacent segments. Such segment EPDs may be used for digital clocks, e-signs and e-price tags.

The fourth aspect of the present invention is directed to a novel connecting system for a display module. The system does not need precision bonding of the display panel to a driver circuitry and is more reliable and easier to install and maintain.

The fifth aspect of the present invention is directed to a novel EPD system, especially suitable for use as price tags. In this system, an EPD panel is inserted or snapped into an open slot of a base structure which is connected to driver and controller circuits. No assembling or complicated bonding of the EPD panel to the base structure is needed. The contact pads in the base structure are prearranged to correspond precisely to the electrode contacts of the EPD panel. No fan-in/fan-out flexible adapter that connects the panel to the driver circuitry is required.

The sixth aspect of the present invention is directed to an alternative system, also suitable for use as price tags. In this system, an EPD panel is inserted into a base structure from the front open face of the structure and then secured by a front plate. Alternatively, the driver circuit may be integrated into the EPD panel. A further alternative is that both the driver and controller circuitries are integrated in the EPD panel.

BRIEF DESCRIPTION OF THE DRAWINGS

FIGS. 2A-2C illustrate one of the electrode designs of the present invention.

FIGS. 4A-4G illustrate segment electrode designs of the present invention.

DETAILED DESCRIPTION OF THE INVENTION

Technical Background

Preparation of Micro-Cup Based Display Panel

Figure 1:
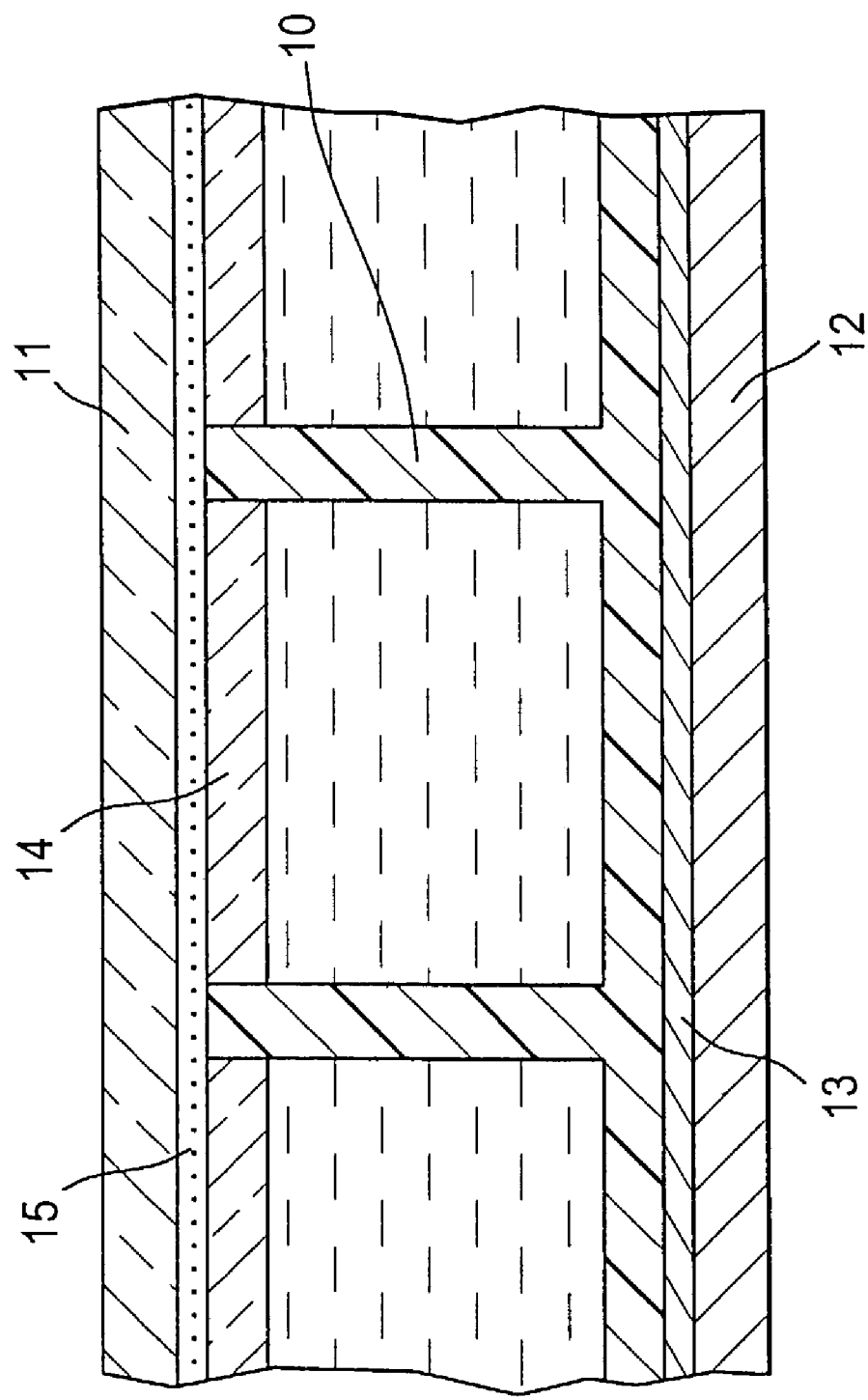
FIG. 1 depicts a typical display cell prepared by the microcup technology.

FIG. 1 depicts a typical display cell prepared by the microcup technology as disclosed in WO01/67170. The microcup-based display cell (10) is sandwiched between a first electrode layer (11) and a second electrode layer (12). A primer layer (13) is optionally present between the cell and the second electrode layer (12). The cell (10) is filled with an electrophoretic fluid and sealed with a sealing layer (14). The first electrode layer (11) is laminated onto the sealed cell optionally with an adhesive (15).

The display panel may be prepared by microembossing or photolithography as disclosed in WO01/67170. In the microembossing process, an embossable composition is coated onto the conductor side of the second electrode layer (12) and embossed with a male mold to produce arrays of microcups. To improve the mold release property, the conductor layer may be pretreated with a thin primer layer (13) before coating the embossable composition.

The embossable composition may comprise a thermoplastic, thermoset or precursor thereof which may be a multifunctional acrylate or methacrylate, vinylbezene, vinylether, epoxide, an oligomer or polymer thereof, or the like. Multifunctional acrylate and its oligomers are the most preferred. A combination of a multifunctional epoxide and a multifunctional acrylate is also useful to achieve desirable physico-mechanical properties. A crosslinkable oligomer imparting flexibility, such as urethane acrylate or polyester acrylate, is usually also added to improve the flexure resistance of the embossed microcups. The composition may contain an oligomer, a monomer, additives and optionally a polymer. The glass transition temperature (Tg) for the embossable composition usually ranges from about $-70°$ C. to about $150°$ C., preferably from about $-20°$ C. to about $50°$ C.

The microembossing process is typically carried out at a temperature higher than the Tg. A heated male mold or a heated housing substrate against which the mold presses may be used to control the microembossing temperature and pressure.

The mold is released during or after the precursor layer is hardened to reveal the microcups (10). The hardening of the precursor layer may be accomplished by cooling, solvent evaporation, cross-linking by radiation, heat or moisture. If the curing of the thermoplastic or thermoset precursor is accomplished by UV radiation, UV may radiate onto the thermoplastic or thermoset precursor layer through the transparent conductor layer. Alternatively, UV lamps may be placed inside the mold. In this case, the mold must be transparent to allow the UV light to radiate on to the thermoplastic or thermoset precursor layer.

The microcups are then filled with an electrophoretic fluid and sealed as disclosed in co-pending applications, U.S. Ser. No. 09/518,488, filed on Mar. 3, 2000 (corresponding to WO 01/67170), U.S. Ser. No. 09/606,654, filed on Jun. 28, 2000 (corresponding to WO 02/01281) and U.S. Ser. No. 09/784,972, filed on Feb. 15, 2001 (corresponding to WO02/65215), all of which are incorporated herein by reference.

The sealing of the microcups may be accomplished in a number of ways. Preferably, it is accomplished by overcoating the filled microcups with a sealing composition comprising a solvent and a rubber material selected from the group consisting of thermoplastic elastomers, polyvalent acrylate or methacrylate, cyanoacrylates, polyvalent vinyl including vinylbenzene, vinylsilane, vinylether, polyvalent epoxide, polyvalent isocyanate, polyvalent allyl, oligomers or polymers containing crosslinkable functional groups, and the like. Additives such as a polymeric binder or thickener, photoinitiator, catalyst, filler, colorant or surfactant may be added to the sealing composition to improve the physico-mechanical properties and the optical properties of the display. The sealing composition is incompatible with the electrophoretic fluid and has a specific gravity no greater than that of the electrophoretic fluid. Upon solvent evaporation, the sealing composition forms a conforming seamless seal on top of the filled microcups. The sealing layer may be further hardened by heat, radiation or other curing methods. Sealing with a composition comprising a thermoplastic elastomer is particularly preferred. Examples of thermoplastic elastomers may include, but are not limited to, tri-block or di-block copolymers of styrene and isoprene, butadiene or ethylene/butylene, such as the Kraton™ D and G series from Kraton Polymer Company. Crystalline rubbers such as poly (ethylene-co-propylene-co-5-methylene-2-norbornene) and other EPDM (Ethylene Propylene Diene Rubber terpolymer) from Exxon Mobil have also been found useful.

Alternatively, the sealing composition may be dispersed into an electrophoretic fluid and filled into the microcups. The sealing composition is incompatible with the electrophoretic fluid and is lighter than the electrophoretic fluid. Upon phase separation and solvent evaporation, the sealing composition floats to the top of the filled microcups and forms a seamless sealing layer thereon. The sealing layer may be further hardened by heat, radiation or other curing methods. The sealed microcups finally are laminated with the first electrode layer (11) optionally pre-coated with an adhesive layer (15).

The entire process as described above may be carried out roll-to-roll continuously as disclosed in a co-pending application, U.S. Ser. No. 09/784,972 filed on Feb. 15, 2001, the content of which is herein incorporated by reference. Briefly, the microcup-based display cells are formed integrally with one another as portions of a structured two-dimensional array assembly on a moving web. The web upon which the microcups are formed includes a display addressing array comprising a preformed electrode layer, such as one with ITO conductor lines. The electrode layer (ITO lines) is coated with the embossable composition as described above for formation of the microcups.

In practice, the preformed electrode layer (corresponding to 12 in FIG. 1) on the web is transparent which ultimately may be the viewing side of the display.

The Cutting/Stripping Process

To expose the electrode for circuitry connection, a strip coating or patch coating process may be employed to deposit the embossable composition (for forming the microcups) onto selected areas of the substrate. However, this process has many disadvantages. An improved process of exposing the electrode lines was disclosed in a co-pending application, U.S. Ser. No. 10/422,608 filed on Apr. 23, 2003, which is incorporated herein by reference. The improved process involves (1) cutting the EPD panel to a desired dimension and shape, followed by removing one electrode layer (for example 11, in FIG. 1) in a predetermined area by, for example, a die, diamond, knife or a laser cutting method to expose the layers underneath (which may include the adhesive layer, sealing layer, microcups layer and primer layer), (2) stripping off the exposed layers by, for example, a stripping, solvent or solution and finally (3) connecting the exposed conductor lines on the other electrode layer (12 in FIG. 1) to a driver circuitry. This process may be repeated to expose the electrode lines or patterns of the EPD panel in other areas, when required, for connection to a driver circuitry.

To improve the strippability of the exposed layers in step (2) above, a polymeric additive that is soluble or dispersible in an organic or aqueous stripper may be added to the embossing composition for forming the microcups. If an aqueous stripper is used, suitable polymeric additives for the embossing composition may include, but are not limited to, water soluble or dispersible polymers such as polyethylene glycol, poly(2-ethyl-2-oxazoline), polyvinylpyrrolidone (PVP), hydroxyethyl cellulose (HEC), hydroxypropyl cellulose (HPC) and copolymers or block copolymers thereof, acidic or basic copolymers derived from acrylic acid or methacrylic acid such as Carboset 515 (from BFGoodrich, Cleveland, Ohio), itaconic acid, maleic anhydride, vinyl phthalate and vinylpyridine. If an organic stripper is used, suitable polymeric additives for the embossing composition may include, but are not limited to, solvent soluble or dispersible polymers or oligomers such as polyester, polyvinyl butyral, acrylic or methacrylic copolymers, styrene copolymers, polycaprolatones, polyethers, polycarbonates, polyamides and polyurethanes.

The composition of the primer layer may be the same or different from the embossing composition. The sealing composition may be one of the sealing compositions described above.

Preferred materials for the strippable adhesive layer may be formed from an adhesive or a mixture thereof selected from a group consisting of pressure sensitive, hot melt and radiation curable adhesives. The adhesive materials may include, but are not limited to, acrylics, styrene-butadiene copolymers, styrene-butadiene-styrene block copolymers, styrene-isoprene-styrene block copolymers, polyvinylbutyal, cellulose acetate butyrate, polyvinylpyrrolidone, polyurethanes, polyamides, ethylene-vinylacetate copolymers, epoxides, multifunctional acrylates, vinyls, vinylethers, and their oligomers, polymers and copolymers. Adhesives comprising polymers or oligomers having a high acid or base content such as polymers or copolymers formed from acrylic acid, methacrylic acid, itaconic acid, maleic anhydride, vinylpyridine and derivatives thereof are particularly useful for an aqueous stripping process. The adhesive layer may be post cured by, for example, heat or radiation such as UV after lamination.

When a display panel is subjected to cutting and stripping to expose the conductor lines or patterns for connection to a driver circuitry, one of the electrode layers, for example, the first electrode layer (11) in FIG. 1, in a predetermined area, usually at the end of the panel, is first removed by, for example, a die, diamond, knife or a laser cutting method. The cut may optionally extend into the layers underneath (e.g., the adhesive layer, sealing layer, microcup layer and primer layer), but not into the second electrode layer (12). Before stripping, preferably an edge seal material is applied to the edge lines between all layers not to be stripped, on all sides. The edge seal material protects the layers not to be stripped from the stripping solvent or solution used during stripping. The adhesive, sealing, microcup and primer layers are then stripped off using a stripping solvent, such as benzyl alcohol, isopropyl acetate, butyl acetate, methoxyethanol, butanol, toluene, xylene, cyclohexanone or ketones, lactones, esters, ethers, alcohols, amides, pyrrolidones or derivatives or mixtures thereof. Alternatively, the layers may be stripped off using an aqueous stripper, such as aqueous developer Shipley 453 or CD26 (from Shipley, Marlborough, Mass.), which is particularly useful if an acid composition is used for the adhesive, sealing, microcup or primer layer. Stripping may also be assisted by spraying of the stripper with a nozzle or compressed air or application by a soft brush and other mechanical or physical means.

The cutting/stripping process as described above removes the layers in the area except the second electrode layer (12). As a result, the second electrode layer in the area is exposed and the conductor lines on the exposed area may then be connected to a driver circuitry. The same stripping process may similarly be carried out to expose the conductor lines on the first electrode layer (11) in a different area for connection to a driver circuit.

I. Electrode Designs of the Present Invention

Figure 2A:
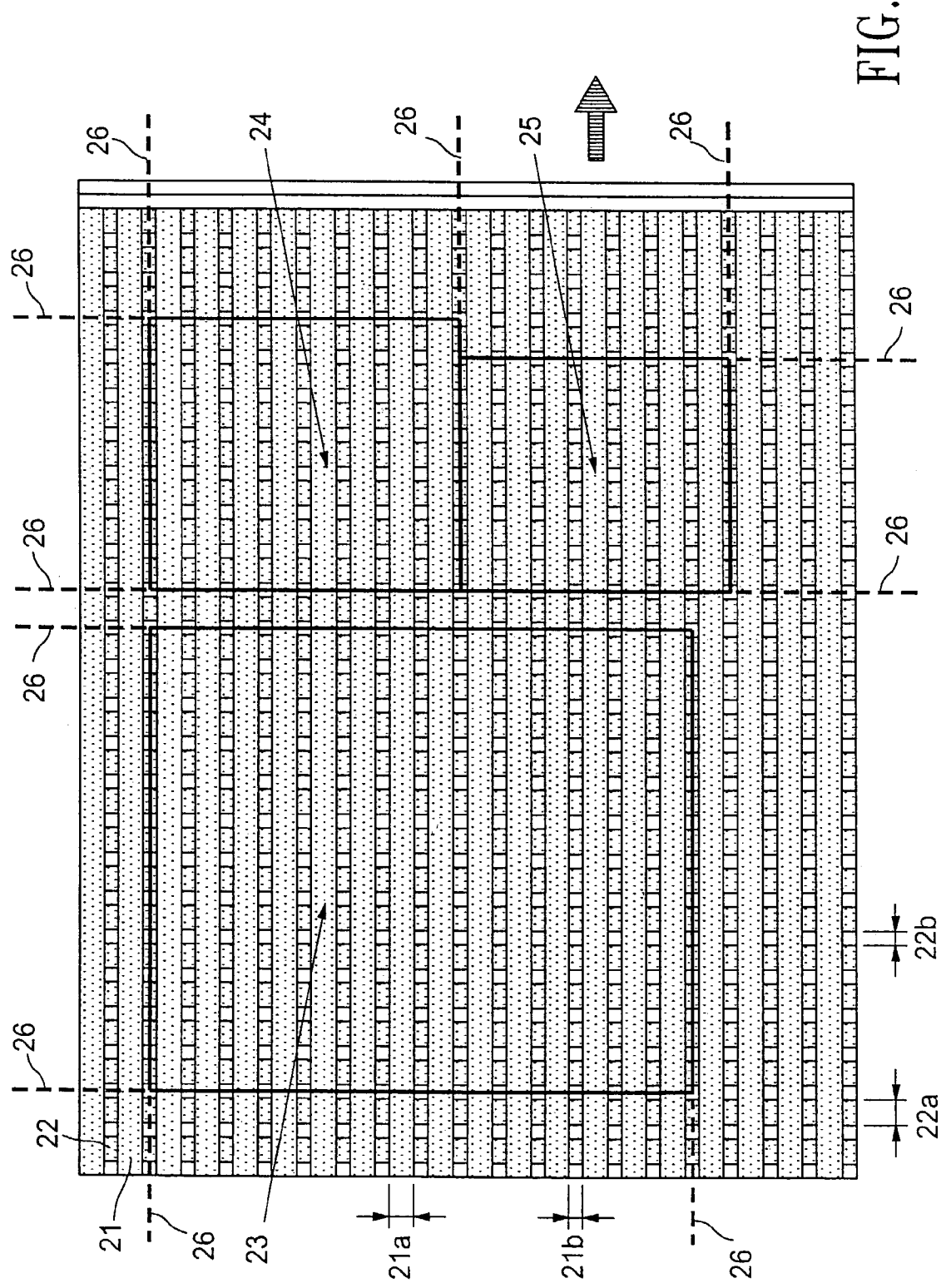

In one of the electrode designs is shown in FIG. 2A, the microcup-based cells (not shown) are sandwiched between a top row electrode layer (21) and a bottom column electrode layer (22).

In a roll to roll continuous process, the top row electrode layer and the bottom column electrode layer are on two separate moving webs. The top row electrode layer (21) has row electrodes aligned with the web moving direction (see arrow). The column electrodes on another moving web are perpendicular to the row electrodes. The moving row electrode web and the moving column electrode web are finally aligned for construction of a display panel.

All the row electrodes have substantially the same electrode width (21a) and substantially the same electrode gap (21b). All the column electrodes have substantially the same electrode width (22a) and substantially the same electrode gap (22b). The width of the row electrodes (21a) may be the same as the width of the column electrodes (22a). The gap between the row electrodes (21b) may also be the same as the gap between the column electrodes (22b). The width of the electrodes generally may be in the range of about 20 to about 5000 microns, preferably about 100 to about 1000 microns. The gap between the electrodes may be in the range of about 5 to about 500 microns, preferably about 5 to about 100 microns.

One approach to fabricate such a patterned electrode layer typically involves the use of photolithographic techniques and chemical etching. Conductor films useful for plastic display applications may be formed by a process such as laminating, electroplating, sputtering, vacuum deposition or a combination thereof, for forming a conductor film onto a plastic substrate. Useful thin film conductors include metal conductors such as aluminum, copper, zinc, tin, molybdenum, nickel, chromium, silver, gold, iron, indium, thallium, titanium, tantalum, tungsten, rhodium, palladium, platinum or cobalt, and the like, and metal oxide conductors such as indium tin oxide (ITO) or indium zinc oxide (IZO), as well as alloys or multilayer composite films derived from the aforementioned metals and/or metal oxides. Further, the thin film structures described herein may comprise either a single layer thin film or a multilayer thin film. ITO films are of particularly interest in many applications because of their high degree of transmission in the visible light region. Useful plastic substrates include epoxy resins, polyimide, polysulfone, polyarylether, polycarbonate (PC), polyethylene terephthalate (PET), polyethylene terenaphthalate (PEN), poly(cyclic olefin) and composites thereof. The conductor-on-plastics films are typically patterned by a photolithographic process which comprises steps including (1) coating the conductor film with photoresist; (2) patterning the photoresist by image-wise exposing it through a photomask to, for example, ultraviolet light; (3) "developing" the patterned image by removing the photoresist from either the exposed or the unexposed areas, depending on the type of photoresist used, to uncover the conductor film in areas from which it is to be removed (i.e., areas where no electrode lines is to be located); (4) using a chemical etching process to remove the conductor film from the areas from which the photoresist has been removed; and (5) stripping the remaining photoresist to uncover the electrode lines.

The electrode design of FIG. 2A can be easily connected to a driver circuit without a fan-in/fan-out adaptor. It is particularly suitable for the connecting system of the present invention (see Section III below). The display panel may be cut into any desired shapes and sizes.

The dotted lines (26) in FIG. 2A indicates the cutting of the panel into three small panels (23, 24 and 25)

Figure 2C:
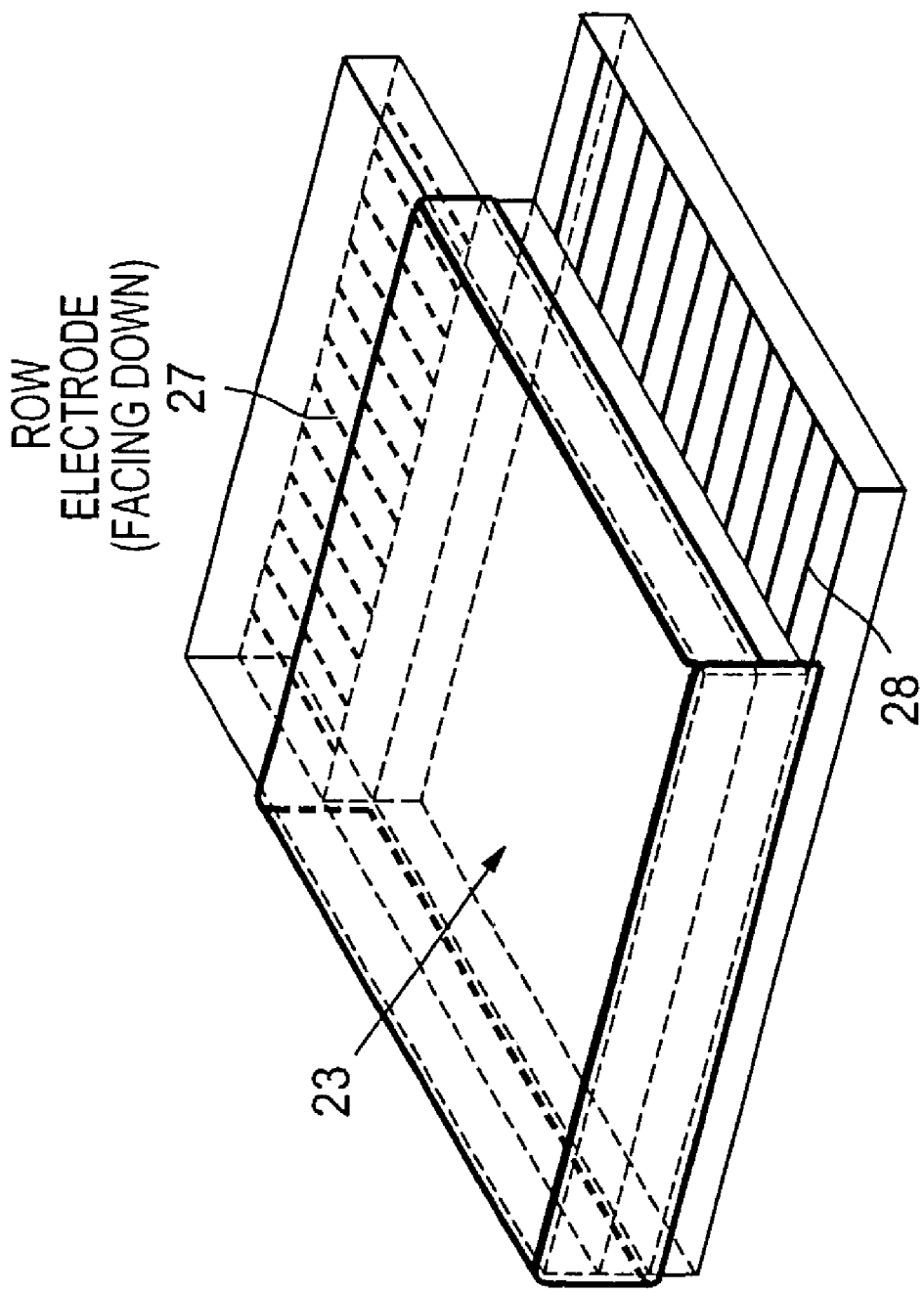

FIG. 2B illustrates how the conductor lines on panel 23 may be exposed and connected to a driver circuit. The panel is subjected to the cutting/stripping process as described above to expose the conductor lines on the electrode layers in predetermined areas (27 and 28) for connection to a driver circuitry. FIG. 2C shows a 3-dimensional view of this configuration. This electrode design enables the display panel to be fabricated in a roll-to-roll process with format flexibility.

Figure 3A:
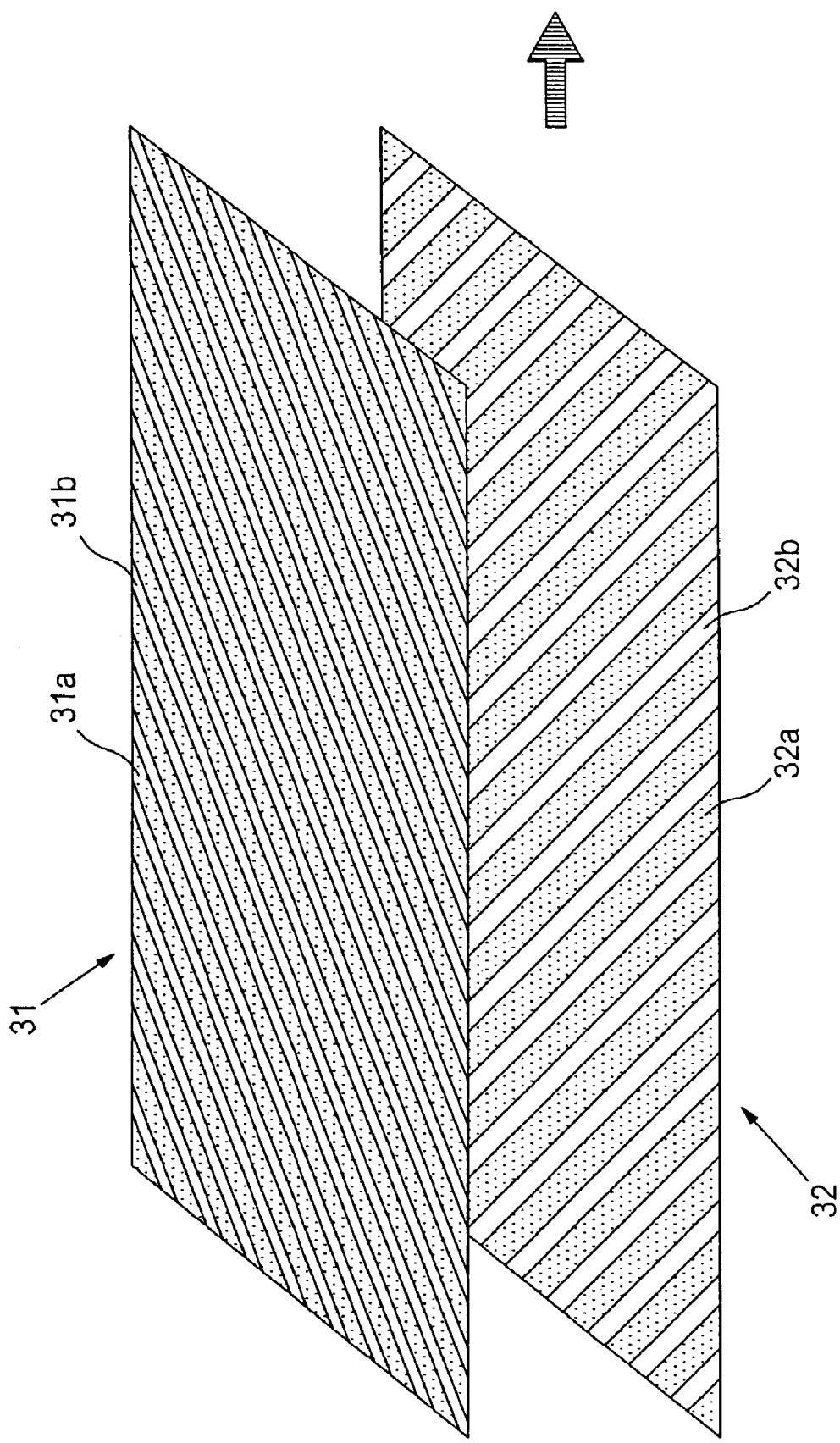
FIGS. 3A-3C illustrate an alternative electrode design of the present invention wherein the row electrodes have an oblique angle from a support web.

An alternative electrode design suitable for roll-to-roll format flexible manufacturing of a passive matrix EPDs is shown in FIG. 3A. The microcup-based cells (not shown) are sandwiched between a top row electrode layer (31) and a bottom column electrode layer (32).

The row and column electrodes form an oblique angle from the direction of a support web (see arrow). More specifically, the row electrodes are arranged in an angle of from about 35° to about 55°, preferably 45°, from the moving direction of the web. The column electrodes of the bottom column electrode layer (32) may form an angle of about 90-degree from the row electrodes.

All the row electrodes have substantially the same electrode width (31a) and substantially the same electrode gap (31b). All the column electrodes have substantially the same electrode width (32a) and substantially the same electrode gap (32b). The width of the row electrodes (31a) may be the same as the width of the column electrodes (32a). The gap between the row electrodes (31b) may be the same as the gap between the column electrodes (32b). The width of the electrodes may be in the range of about 20 to about 5000 microns, preferably about 100 to about 1000 microns. The gap between the electrodes may be in the range of about 5 to about 500 microns, preferably about 5 to about 100 microns.

This type of electrode layer may be fabricated in the same manner as described above for the electrode design of FIG. 2A.

Electrode lines forming an oblique angle, especially a 45-degree angle, with the web direction is particularly suitable for a roll-to-roll manufacturing process. They are easier to be fabricated than the electrode lines aligned in the web direction (0 degree). First of all, electrode lines at an oblique angle from the moving direction are shorter in length than electrode lines aligned in the web direction. In addition, electrode lines aligned in the web direction are difficult to manufacture and easy to break during the roll-to-roll process. Furthermore, the on-line inspection for the electrode continuity of the electrode lines aligned with the web direction is also difficult.

Figure 3B:
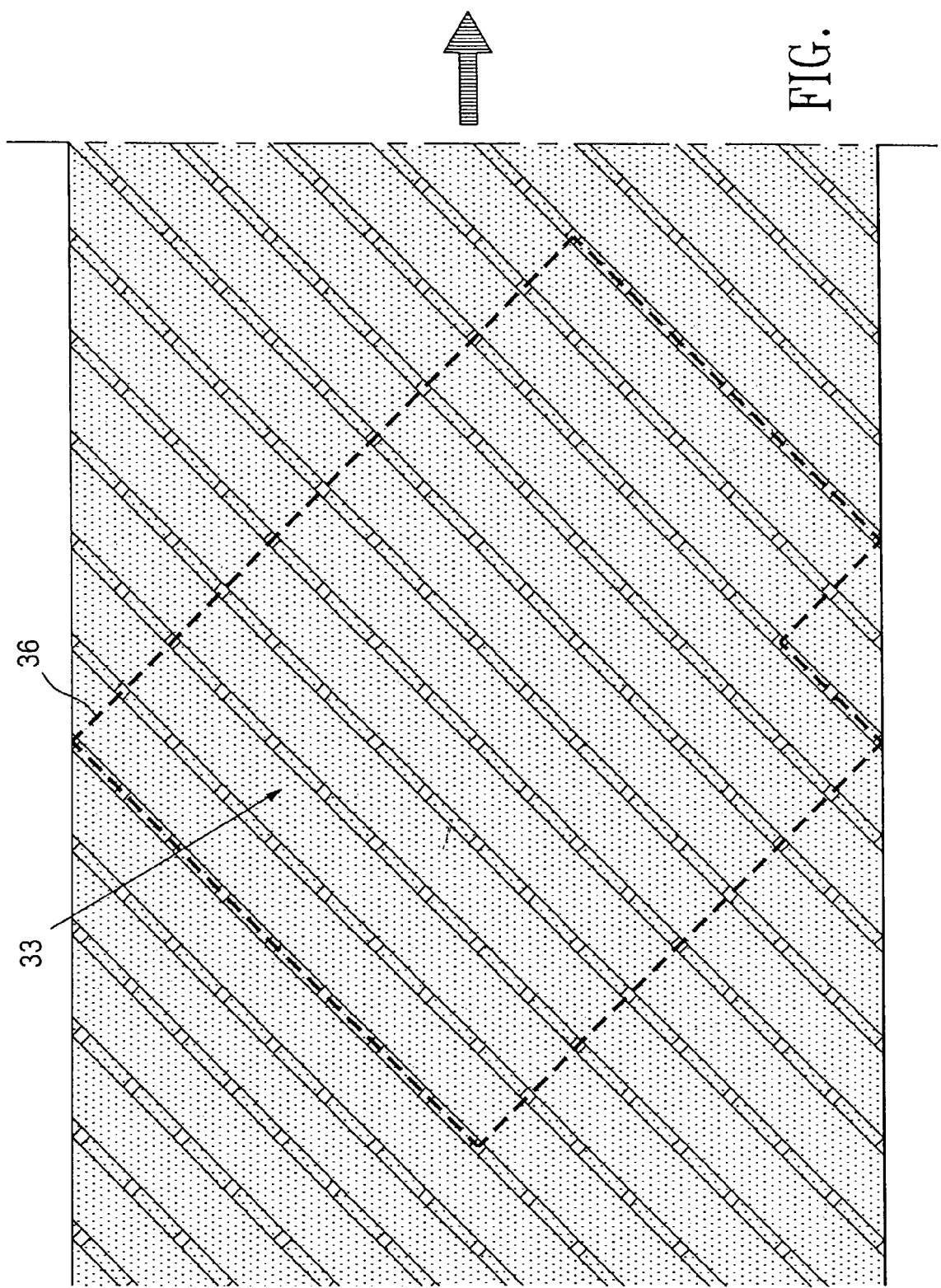

The electrode design of FIG. 3A can also be easily connected to a driver circuit without a fan-in/fan-out adaptor. An EPD panel having the electrode design of FIG. 3A can be cut into any desired sizes and shapes. The dotted lines (36) show the cutting of a panel (33) out of a large panel (FIG. 3B).

Figure 3C:
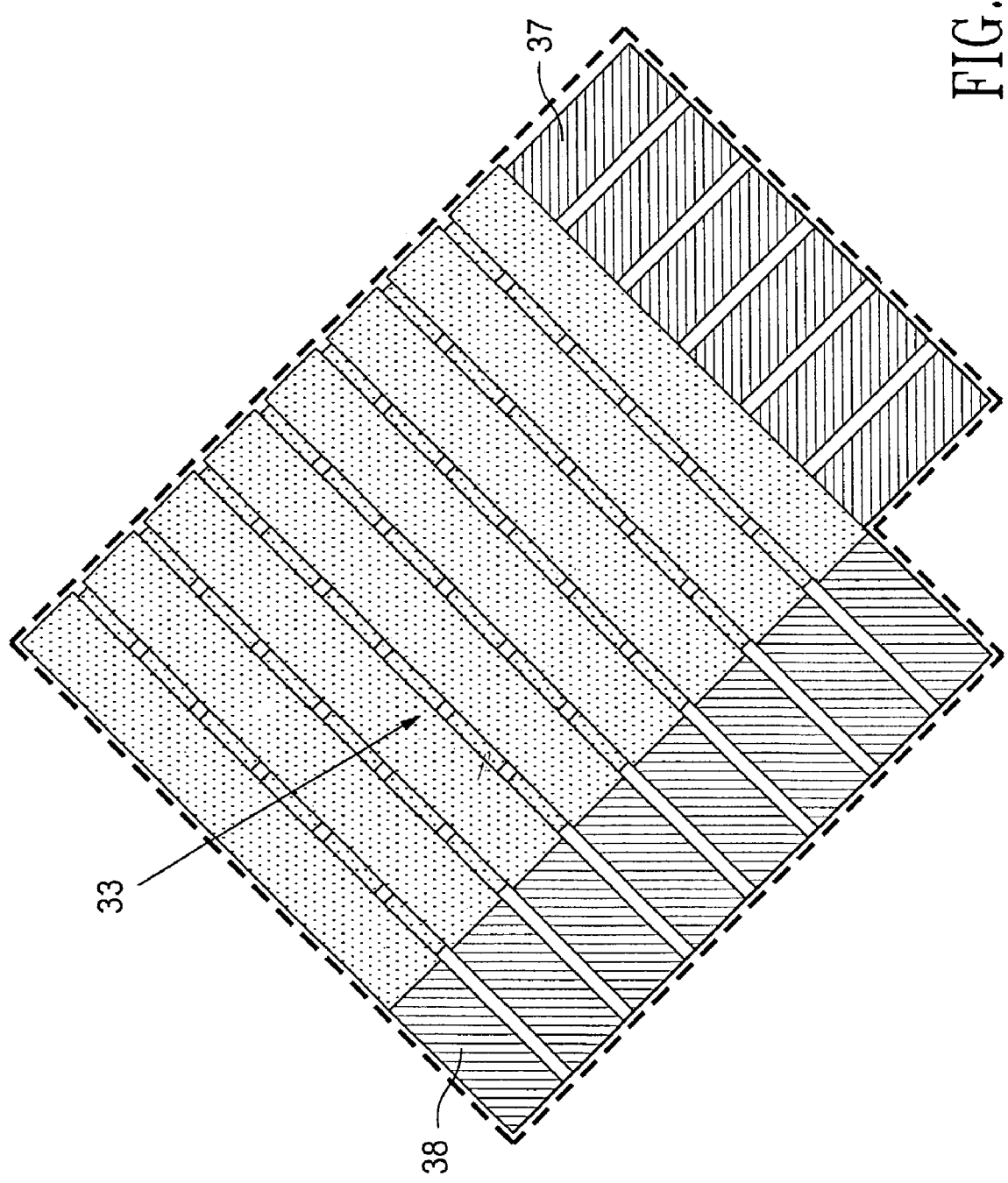

FIG. 3C illustrates how the conductor lines on panel 33 may be exposed and connected to a driver circuit, following the cutting and stripping steps as described above.

II. Segment Display Panel of the Present Invention

Figure 4A:
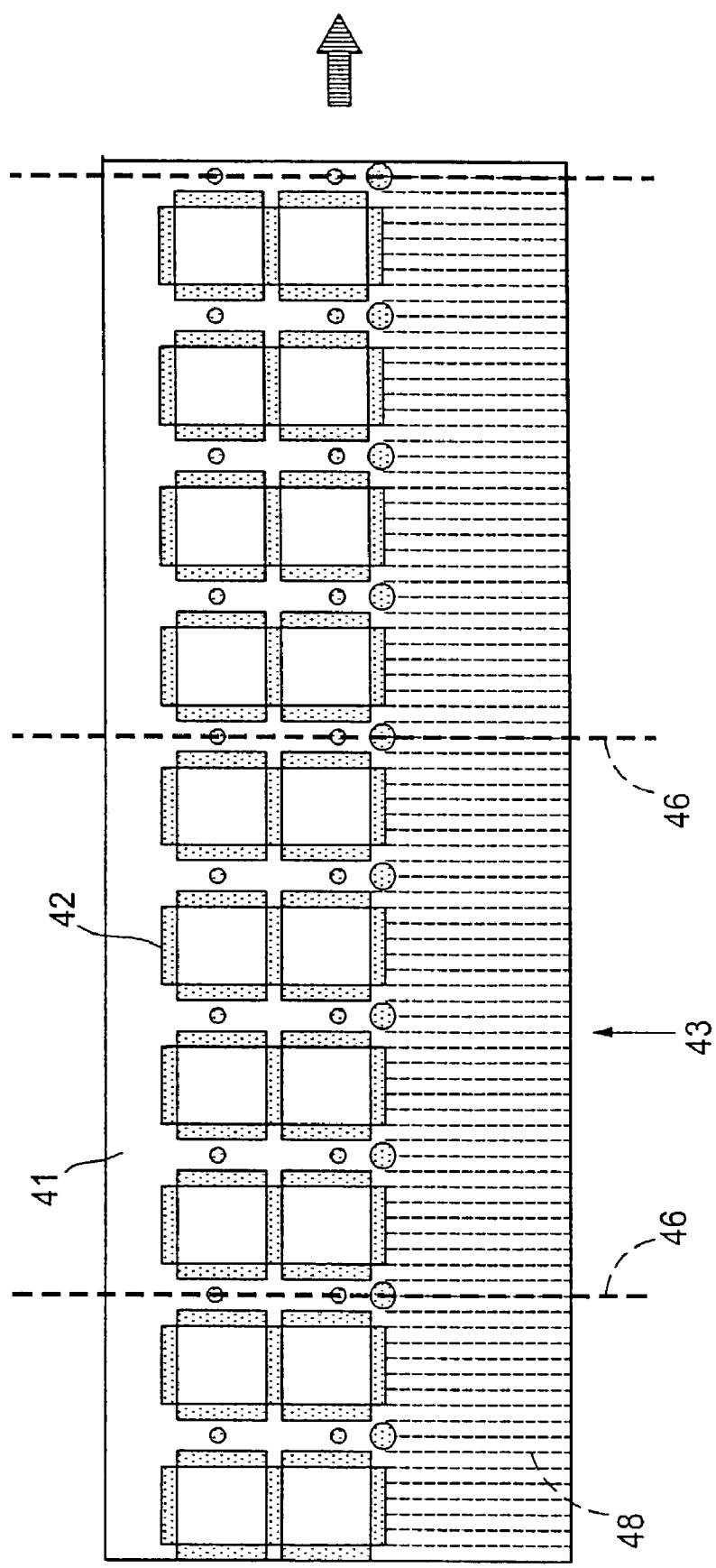

The segment electrode design as shown in FIG. 4A is suitable for roll-to-roll format flexible manufacturing of a segment EPD. The microcup-based cells (not shown) are formed by embossing on a transparent common electrode layer (not shown) which ultimately may be the viewing side of the display. The embossing is carried out on the entire panel. The microcups formed are then filled with an electrophoretic dispersion and sealed as previously described. A segment electrode layer is then laminated over the sealed microcups to complete the EPD panel. The segment electrodes may be formed on a substrate (41). Suitable substrate materials may include, but are not limited to, PET [poly (ethylene terephthalate)], PEN (polyethylene naphthalate), PC (polycarbonate), polysulphone, polyimide, polyarylether, epoxy, phenolic and composites thereof. The traces (48) may be formed on the same side of the segment electrodes (42) or on the opposite side when vias (through holes) are present. The segment electrodes (42) are arranged in a repeating pattern along the web moving direction (see arrow).

The common electrode layer is a single piece which covers the entire display area.

The segment electrode pattern is symmetrical in one or more directions or axes and is also substantially seamless. In other words, the display panel may have a wallpaper type of design and the panel may be cut into any desired formats, shapes or sizes, depending on applications as illustrated in FIGS. 4B-4F.

Figure 4C:
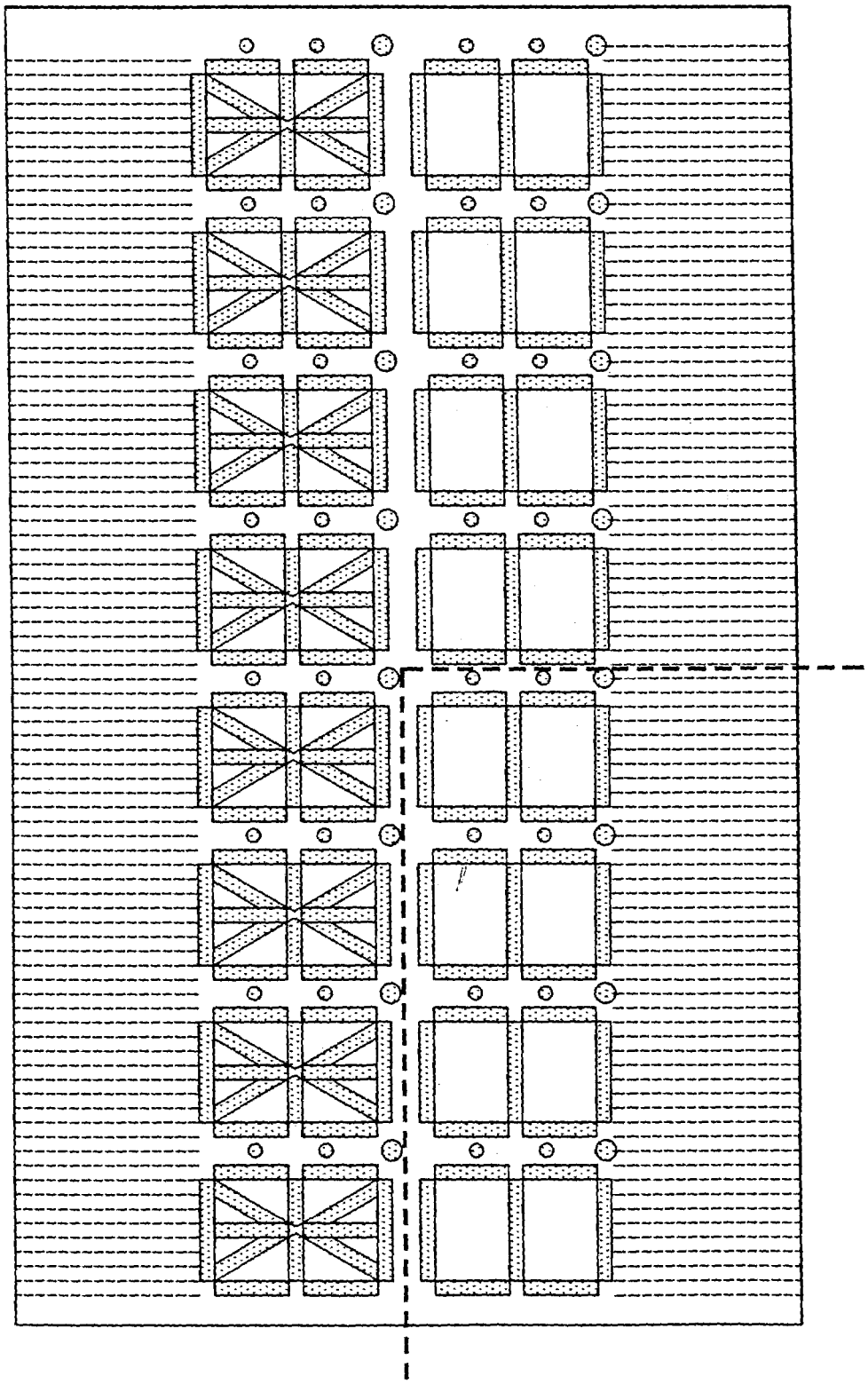
Figure 4F:
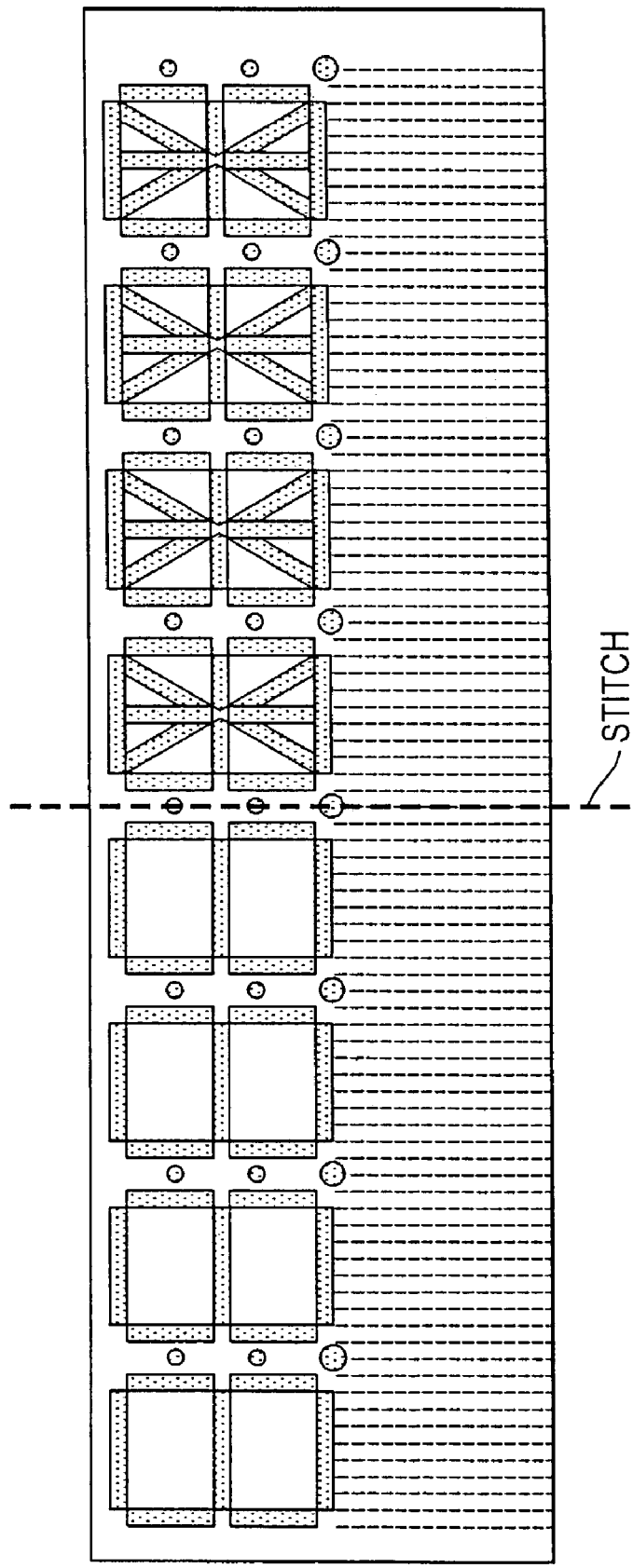

FIG. 4B shows a display panel having both a repeated pattern of a 14-segment alphanumerical design (the top line) and a repeated pattern of a 7-segment design (the bottom line). FIG. 4C demonstrates cutting a small panel out of the original panel and the cutout panel has only the 7-segment pattern. FIG. 4D demonstrates cutting a small panel out of the original panel and the cutout panel has only the 14-segment pattern. FIG. 4E demonstrates cutting the original panel into two pieces, each having a combination of the 7-segment pattern and the 14-segment pattern. FIG. 4F demonstrates that the cut-out panels may be stitched together to form a new panel having a combination of the 7-segment pattern and the 14-segment pattern.

The segment display has a variety of applications. For example, it may be used as a digital clock display (e.g., 05:30), a calendar display (e.g., Dec. 25, 2002 or Dec. 25, 2002) or a price tag display (e.g., 230.40). The three dots between the segment patterns may be turned on or off, depending on the applications.

Figure 4G:
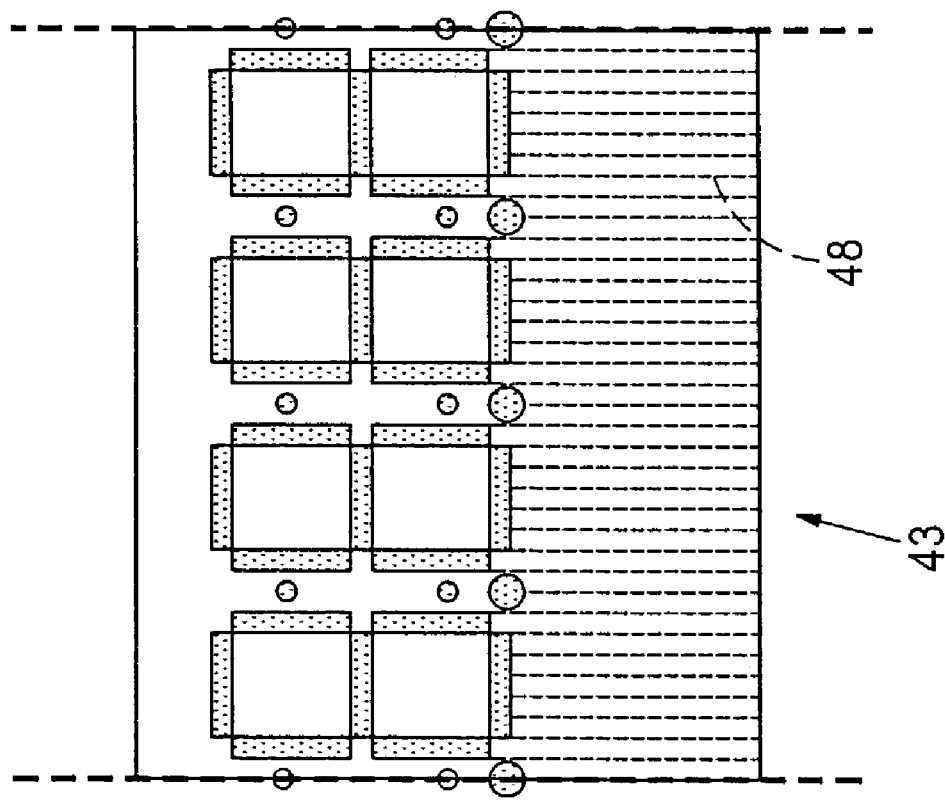

FIG. 4G shows a 4 digit panel (43) cut out of the panel of FIG. 4A along the dotted lines (46). The cut-out panel is subjected to the cutting and stripping steps as described above to expose the electrode lines for connection to a driver circuit. The resulting panel is then used in the connecting system as described below.

III. Connecting System of the Present Invention

The connecting system of a flat panel display typically involves either precision bonding or complicated mechanical devices, which are costly and difficult to maintain. These shortcomings are eliminated in the connecting system of the present invention which may be applied to either a passive matrix display panel or a segment display panel.

1. Passive Matrix Display Panel

Figure 5:
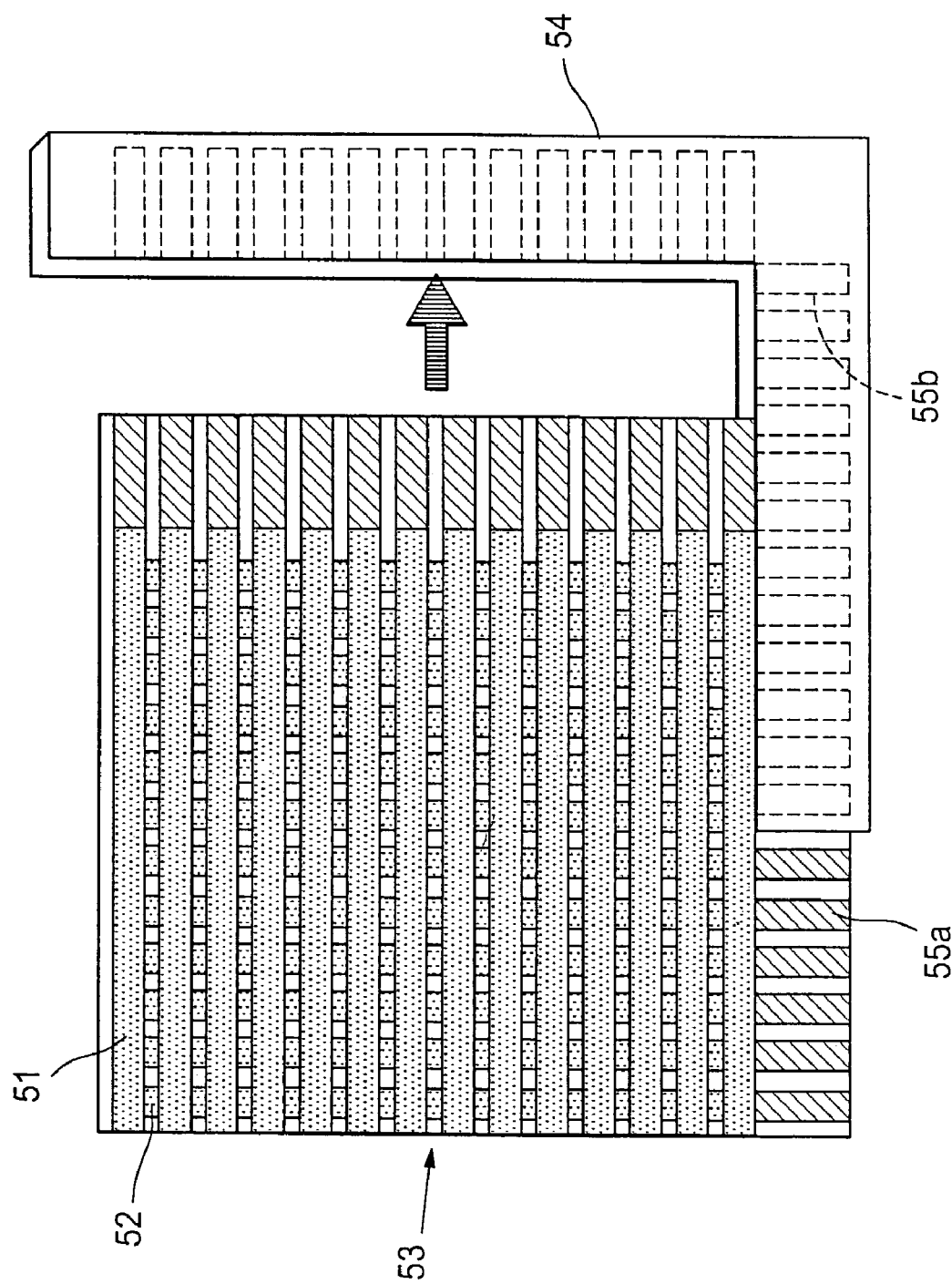
FIG. 5 illustrates the connecting design of the present invention.

The novel connecting system is illustrated in FIG. 5.

FIG. 5 shows a novel connecting system for passive matrix display module. The row electrodes (51) and the column electrodes (52) of the passive matrix panel (53) are routed to the edge of a panel. In this embodiment, electrode design of the panel is that of FIG. 2A. In addition, the row electrodes are facing the non-viewing side of the panel and the column electrodes are facing the viewing side of the panel. However, when vias (conducting through holes) are used, the row and column electrodes may face the same direction. A base structure (54) comprises driving and controller circuitries and the connecting system. The passive matrix display panel is insertible into the base structure. The connection system usually comprises contact pads (55b) in the base structure that match the electrode contacts (55a) on the row and column electrodes of the display panel. When a display panel is inserted into the base structure, the electrode contacts (55a) of the row and column electrodes become in contact with the driver circuit through the contact pads (55b) in the base structure. The contact between the electrode contacts and the contact pads can be a tight-fit design, which requires a higher insertion force but provides more reliable contact. Zero-insertion force design can also be used with a mechanical clamping device to secure the display panel to ensure contact.

Alternatively, a connecting system may be similarly constructed for the electrode design of FIG. 3A.

2. Segment Display Panel

The connecting system may also be used for a segment display panel. In this assembly, the segment display panel is also insertible into the base structure. The segment electrodes have electrode contacts which may be in contact with the contact pads in a base structure to cause driving of the display panel by a driver circuit.

IV. Price Tag System of the Present Invention

Price tags and sales sign are an essential operation feature in supermarkets and stores. Because the prices of the merchandise change from time to time, the price tags need to be updated regularly. Printing new tags and placing them at the proper locations is a very labor-intensive and costly process. In fact, it is one of the major operation costs for most stores.

Electronic price tags have been known for many years. LCD and LED have been proposed for use in such applications. However, both types of display are bulky and very power demanding, and therefore are difficult to be integrated into the shelf structures in the stores. They also require a complicated wiring system to connect the panel to the driver and controller circuitries. LCD and LED are also fragile and difficult to maintain.

FIGS. 6-9 illustrate a novel price tag system.

Figure 6:
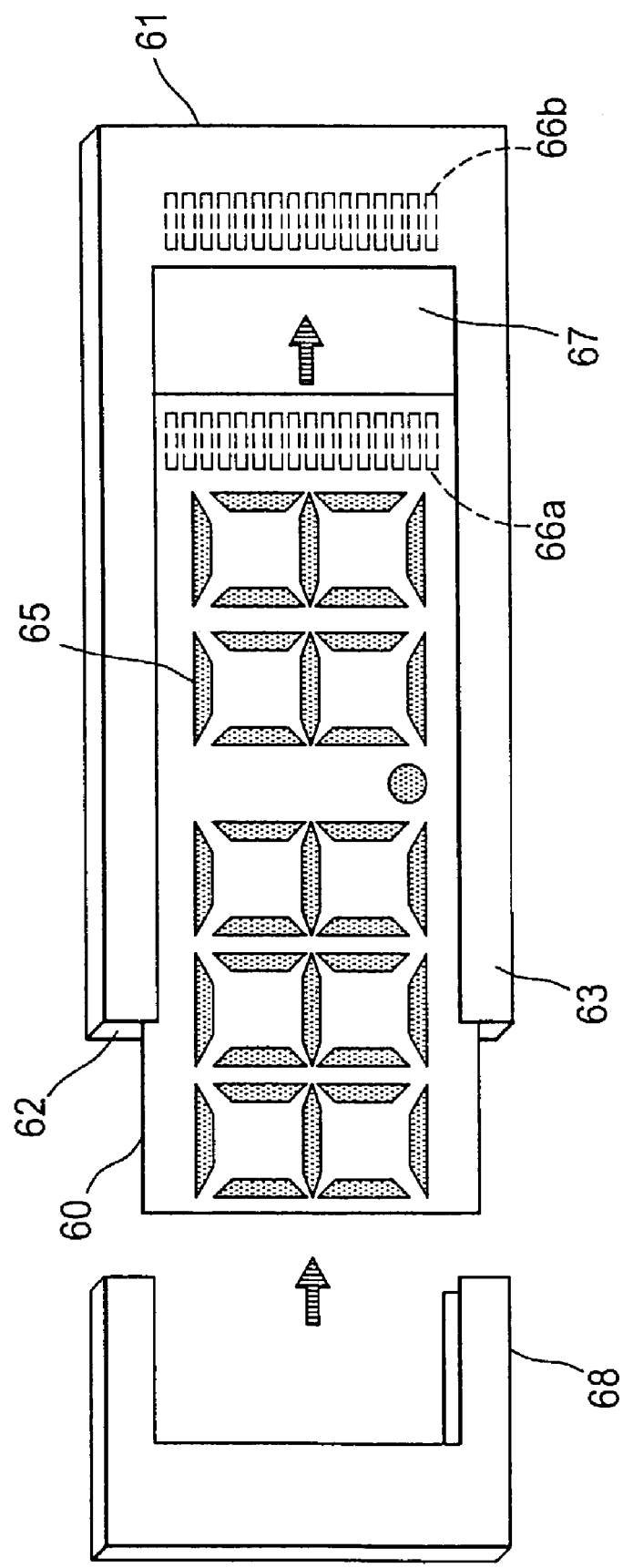
FIGS. 6-9 illustrate the price tag systems of the present invention.

In FIG. 6, an electrophoretic display panel (60) is laminated onto a supporting substrate (not shown). Suitable supporting substrates may include, but are not limited to, acrylics, polystyrene, polycarbonate, polyimide, polyester, polysulfone, polyamides, polyurethane, epoxy, phenolic, melamine and copolymers, blends or composites thereof. Polycarbonate, polyester, polyimide, polysulfone, phenolic resins and composites or blends thereof are the most preferred.

The figure shows the display panel partially inserted into a base structure (61) through an open slot (62). The base structure is a receptacle for the display panel and has a front panel (63) and a back panel (64). The segment electrodes (65) have electrode contacts (66a). For illustration purpose, the electrode contacts (66a) can be seen in the figure. However, it should be noted that in this embodiment, the electrode contacts (66a) may be located on the non-viewing side or the viewing side of the segment electrodes.

A circuit board (67) may be built into the base structure. On the circuit board (67), the display driver, controller and communication circuits (none of them shown) are on one side or both sides of the board, whereas contact pads (66b) are on only one side of the board. In one embodiment, the contact pads (66b) are on the side of the circuit board facing the non-viewing side of the display panel to allow the contact pads (66b) to be in contact with the electrode contacts (66a).

After the display panel is fully inserted into the base structure and firmly secured in its position within the base structure, the electrode contacts (66a) behind the segment electrodes are in contact with the contact pads (66b) on the circuit board. The contact provides connection between the display panel and the circuit board. The driver circuit and other components on the circuit board then drive the display panel.

In this design, preferably there is a side-locking panel (68), which may be pressed into the base structure to ensure that the display panel is secured within the base structure.

The electrode contacts (66a) usually are thin film conductor or thick film conductor formed by sputtering, vacuum or vapor deposition, electroplating or lamination. The contact pads (66b) of the base structure used in the present invention may be in the form of any electrical connector, such as edge connector, elastomer connector, leaf-spring contacts, conductive adhesive, gold bumps or any other type of connector that provides reliable contact.

While it is demonstrated in FIG. 6 that the right-hand side of the display panel is the side of insertion into the base structure, the design may be easily modified to have either one of the three other sides, top, bottom or left, to be the side of insertion on the display panel.

Furthermore, while it is demonstrated in FIG. 6 that the circuit driver, controller and communication circuits on the circuit board are built into the base structure, it is understood that the driver circuit may be integrated into the display panel. Other components such as the controller and communication circuits may also be integrated into the display panel. When the driver circuit is integrated into the display panel, the control signals and power are transmitted from the controller to the driver through the electrode contacts (66a) of the display panel and the contact pads (66b) of the circuit board. In the case of integrating the driver, controller and communication circuits into the display panel, only the power supply is provided through the contact pads. Depending on the application and system requirements, different circuitries may be integrated in the display panel to provide specific functions, such as wireless communication.

Figure 7:
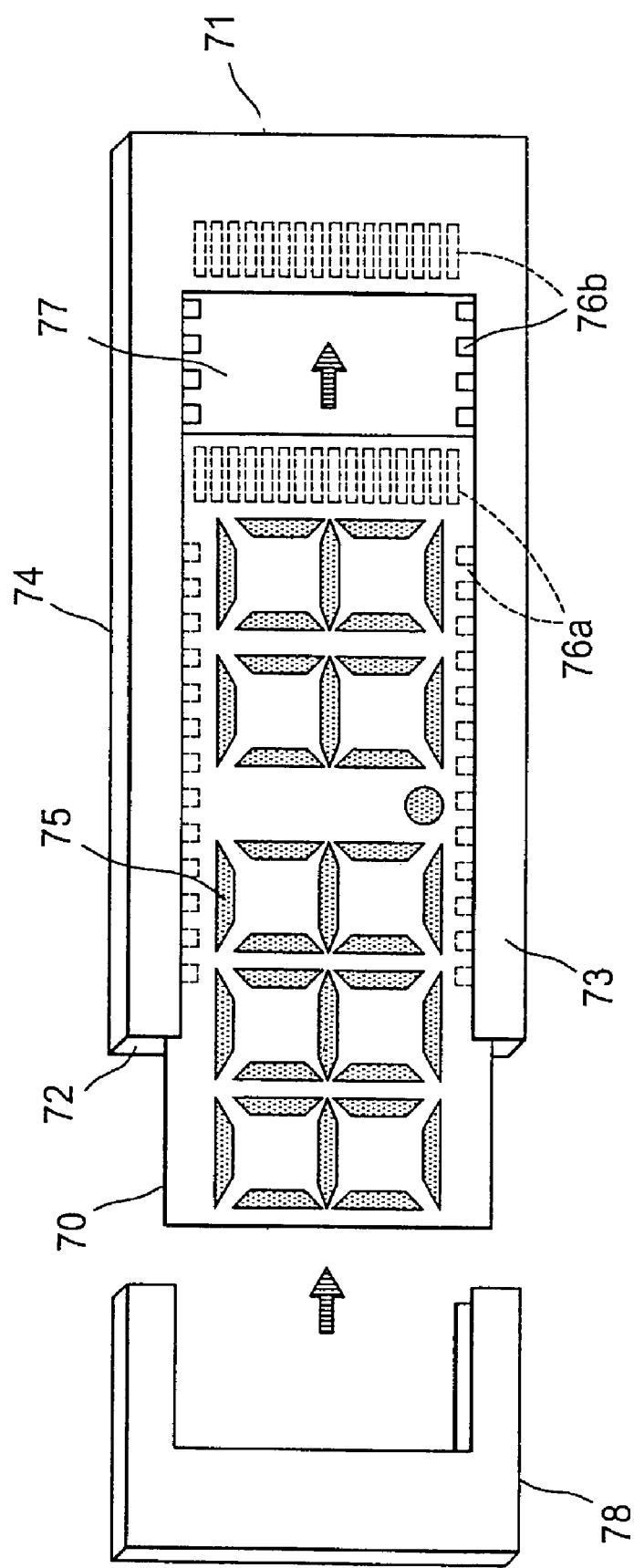

FIG. 7 illustrates an alternative design of the price tag system, which is similar to that of FIG. 6 except that there are multiple electrode contacts (76a) on the segment electrodes and each of the electrode contacts (76a) has a corresponding contact pad (76b) on the circuit board. This design allows an increase in number of the segment electrodes and also size of the segment electrodes. The reliability of the contact may also be improved.

Figure 8:
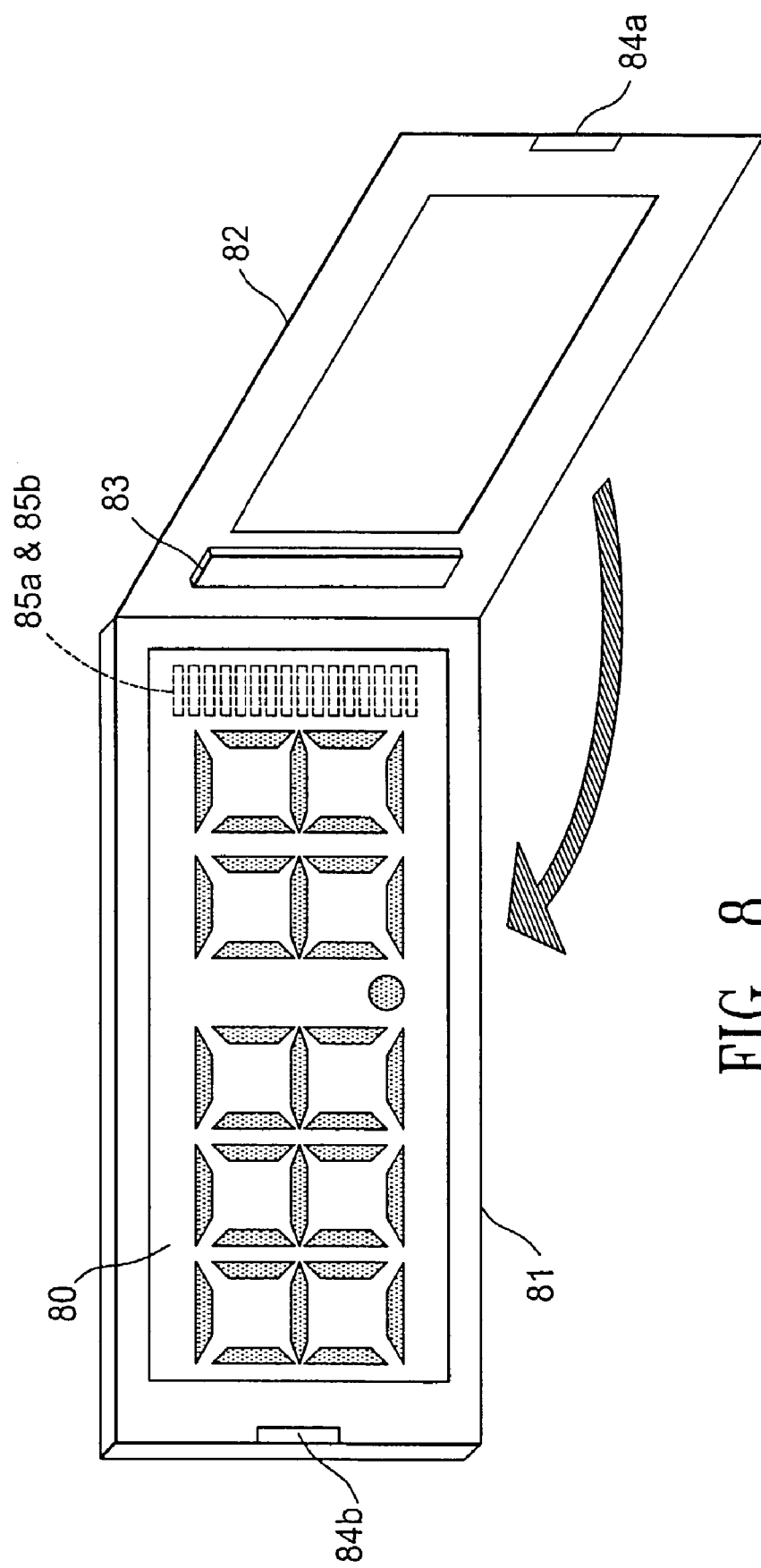

FIG. 8 shows another alternative design of the present invention, which is also similar to that of FIG. 6, except that the display panel (80) is inserted into the base structure (81) from the front open face of the structure. There is a hinged front plate (82), which, after closure, presses against the electrode contact area to ensure a reliable contact between the electrode contacts (85a) on the display panel and the contact pads (85b) on the circuit board. There is pressing foam (83) on the inside surface of the front plate for this purpose. The front plate also provides extra security to protect the display panel in the base structure. As shown in FIG. 8, there may also be locking device (84a and 84b) to ensure complete closure of the front plate.

While it is demonstrated in FIG. 8 that the front plate is hinged at the right-hand side of the base structure, the design may be easily modified to have the top plate hinged in either one of the three other sides, top, bottom or left, or non-hinged.

Similarly, while it is demonstrated in FIG. 8 that the circuit driver, controller and communication circuits are built into the base structure, it is understood that the driver circuit may be integrated into the display panel. Other components on the circuit board may be integrated into the display panel.

Figure 9:
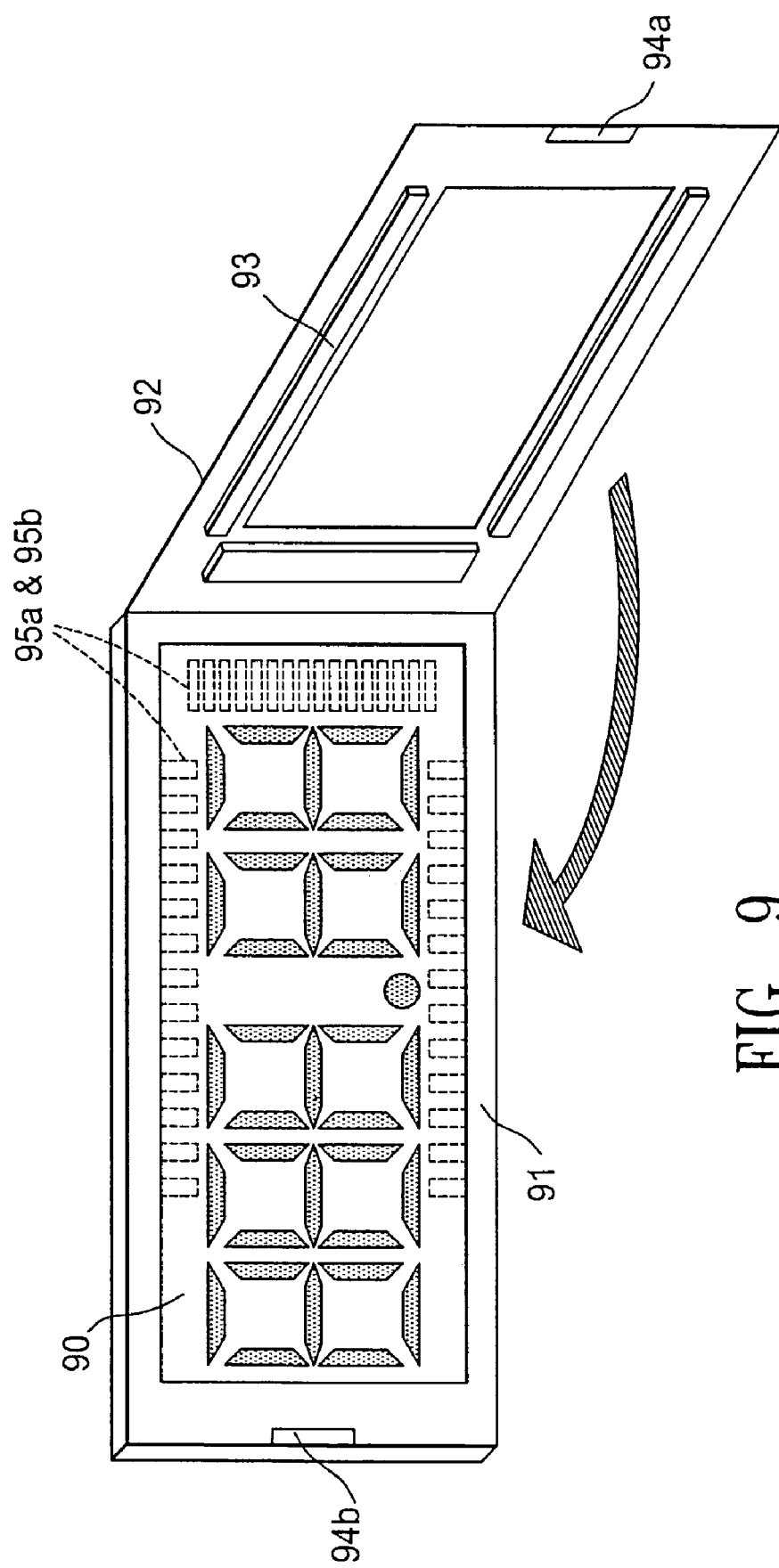

FIG. 9 shows a design similar to that of FIG. 8, except that it has multiple electrode contacts (95a) on the display panel and corresponding contact pads (95b) on the circuit board.

It is noted that the display panel of the price tag system may have the passive matrix electrode design of FIG. 2A or 3A. The same connection system can be used for a passive matrix display panel.

The programming of the price tag system in any of the designs demonstrated above can be accomplished through an I/O interface such as a serial port or through wireless communication, the latter being preferred.

The price tag system of the present invention has the advantages of reliability, easy to install and low cost. It is much more cost effective than, for example, the ACF/FPC type connection. Using the system of the invention, the prices can be easily updated even from a remote location. In addition, if there is one defective panel, the defective panel can be easily removed and replaced without any changes made to the base structure. This also greatly reduces the operation costs.

While the present invention has been described with reference to the specific embodiments thereof, it should be understood that various changes may be made and equivalents may be substituted without departing from the true spirit and scope of the invention. In addition, many modifications may be made to adapt to a particular situation. For example, while FIGS. 6-9 show only the typical numerical pattern for price tag display, it is understood that the display pattern can be easily modified for use in any types of electronic labeling systems. All such modifications are intended to be within the scope of the claims appended hereto.

What is claimed is:

1. A segment display comprising
   (i) a first flexible segment display panel which comprises a first common electrode layer and a first segment electrode layer, wherein the first segment electrode layer comprises a 7-segment design pattern or 14-segment design pattern; and
   (ii) a second flexible segment display panel which comprises a second common electrode layer and a second segment electrode layer, wherein the second segment electrode layer comprises a 7-segment design pattern or a 14-segment design pattern, wherein the first flexible segment display panel and the second flexible segment display panel are microcup-based panels that are stitched together to form a segment display.

2. The display of claim 1 wherein said 7-segment design pattern or said 14-segment design pattern is symmetrical in one or more directions.

3. The display of claim 1 wherein said 7-segment design pattern or said 14-segment design pattern is substantially seamless.

4. The display of claim 1 wherein said first or second common electrode layer comprises electrodes having substantially the same width and substantially the same gap in between.

5. The display of claim 4 wherein said electrodes are perpendicular to the direction of a support web.

6. The display of claim 1 which is suitable for a digital clock display.

7. The display of claim 1 which is suitable for a price tag display.

8. The display of claim 1 wherein said first flexible segment display panel and said second flexible segment display panel are EPD segment display panels.

9. The display of claim 1 wherein the first segment electrode layer comprises a 7-segment design pattern, and the second segment electrode layer comprises a 14-segment design pattern.

* * * * *